(12) United States Patent
Kramer

(10) Patent No.: US 6,216,140 B1
(45) Date of Patent: *Apr. 10, 2001

(54) METHODOLOGY FOR THE EFFICIENT MANAGEMENT OF HIERARCHICALLY ORGANIZED INFORMATION

(75) Inventor: Scott Kramer, Fort Collins, CO (US)

(73) Assignee: Hewlett-Packard Company, Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/931,980

(22) Filed: Sep. 17, 1997

(51) Int. Cl.[7] ............................. G06F 15/00; G06F 17/00; G06F 17/21; G06F 17/24

(52) U.S. Cl. .......................... 707/511; 707/10; 707/203; 717/11

(58) Field of Search ............................... 707/203, 1, 515, 707/2, 102, 8, 511, 10; 709/219, 242, 204; 717/11

(56) References Cited

U.S. PATENT DOCUMENTS

| | | | |
|---|---|---|---|
| 5,553,216 | * | 9/1996 | Yoshioka et al. ................. 707/515 |
| 5,574,898 | * | 11/1996 | Leblang et al. ..................... 707/1 |
| 5,581,764 | * | 12/1996 | Fitzgerald et al. ................ 395/703 |
| 5,649,200 | | 7/1997 | Leblang et al. ................... 395/703 |
| 5,706,510 | * | 1/1998 | Burgoon ........................... 707/203 |
| 5,745,686 | * | 4/1998 | Saito et al. ........................ 717/11 |
| 5,787,444 | * | 7/1998 | Gerken et al. .................... 707/203 |
| 5,790,848 | * | 8/1998 | Wlaschin ......................... 707/201 |
| 5,812,773 | * | 9/1998 | Norin ............................... 709/204 |
| 5,941,955 | * | 8/1999 | Wilby et al. ...................... 709/242 |
| 5,956,718 | * | 9/1999 | Prasad et al. ...................... 707/10 |
| 6,029,195 | * | 2/2000 | Herz ................................ 709/219 |

OTHER PUBLICATIONS

Korn D. G. et al; "A New Dimension for the UnixR File System", Software Practice & Experience, vol. 20, No. S01, Jun. 20, 1990, pp. s1/19–s1/34.

Greenwald, Steven J., A new security policy for distributed resource management and access control, ACM New Security Paradigms Workshop, pp.74–86.*

* cited by examiner

Primary Examiner—Stephen S. Hong
Assistant Examiner—William L. Bashore

(57) ABSTRACT

A methodology ensures the efficient management of large amounts of hierarchically organized information. The methodology encompasses the efficient copying and sharing of large amounts of hierarchically organized information through an unsharing operation. The efficient comparison of two or more hierarchies of items of files and directories is provided as well by adding the root directories of hierarchies to be compared to a difference list, merging and then eliminating appropriate items in the difference list, and finally expansively recursing upon items left in the difference list. The efficiency of virtually copied, hierarchically organized information is maintained by resharing appropriate items of the hierarchy when appropriate. Finally, the methodology allows a target version of a hierarchy to be automatically updated by default action with changes made in a source version of the hierarchy as a function of identifying the common ancestor revision of a particular item change.

18 Claims, 1 Drawing Sheet

METHODOLOGY FOR THE EFFICIENT MANAGEMENT OF HIERARCHICALLY ORGANIZED INFORMATION

FIELD OF THE INVENTION

This invention relates generally to managing hierarchically organized information, and more particularly to an improved method for the efficient sharing and copying of hierarchically organized information.

BACKGROUND OF THE INVENTION

In the development of software, a single hierarchy composed of both files and directories is commonly developed to serve multiple distinct purposes or applications that often stem from a common baseline of code. Each of the distinct applications that use the hierarchy may require changes or modifications be made to some portion of the files or directories of the hierarchy and the required changes may be expected to vary from one application to the next.

It is of course desirable that changes made to the hierarchy of files and directories for a given application be kept distinct from the original hierarchy as well as from changes that may be made for other applications. Copying the hierarchy of files and directories for each application in order to keep track of any changes made for that application, however, may entail the duplication of thousands, perhaps millions, of files and directories. In a system employing a large number of applications (or releases) or employing a hierarchy having a large number of files and directories, such duplication is wasteful of storage space because each copy of the hierarchy that is changed must be stored. Additionally, the system will incur a time penalty in proportion to the number of times the hierarchy of files must be copied in order to accommodate changes required by various applications that share the hierarchy.

Several prior art approaches have been developed in an attempt to reduce the storage space and the time required for copies required of a system that utilizes a hierarchy of files and directories developed for multiple and distinct applications. A first approach has been to make an exact duplication of the data of the entire hierarchy each time a modification by any application is indicated. This approach results in the use of a large storage space and a large instantiation time during which the user of the system waits for the duplication of the hierarchy to be completed.

A second approach has been to maintain revision information concerning every modification made to every file or directory of the hierarchy. Each file and directory has its own revision history and a particular revision of the revision history of a file or directory is selected for an application according to criteria appropriate to that application. When an application requires new or additional changes be made to the hierarchy, a selected version of the hierarchy is accordingly modified to create a new revision of the file or directory that then becomes part of the revision history of the file or directory. This approach offers the advantage of making a particular revision only once that can thereafter by used by any application having need of that revision by simply selecting the correct revision. Whenever a new application or version is created, it is necessary to record the baseline from where it starts in each file or directory. The time associated with initializing a new application or version is significant, then, because the starting point from which it began must be marked resulting in quite a large overhead burden. Consequently, the user of the system encounters significant instantiation time or delay at copy time that is only exacerbated by a large hierarchy of files and directories.

A third prior art approach has been to perform a linear copy-on-write operation only when a file or directory of the hierarchy is to be modified. This approach is commonly used in the kernels of operating systems to share large arrays of memory that are expected to remain unchanged by multiple processes or applications of the system. The control structures required to manage the data of the arrays of memory are not shared and thus must be duplicated for each process, thereby increasing the instantiation time apparent to the user of a system that uses the linear copy-on-write approach. This approach is nonetheless suitable in instances in which the amount of control information of a control structure is very small compared to the amount of data being managed. A reference counter integer for each page of memory of the memory array, for instance, is an illustration of a control structure being very small in comparison to a large amount of data to be managed.

The linear copy-on-write approach of the prior art sacrifices effectiveness for a large hierarchy having a great number of files and directories. The large number of copies expected to be made of a large hierarchy used by multiple, distinct applications would eventually require that the control structures themselves be shared between applications in order to render efficient copy instantiation time. At the present time, control structures are not shared and thus the linear-copy-on-write approach does not offer an efficient instantiation time if used in a system having a hierarchy with a great number of files and directories.

In light of the above discussion, it is clear that there exists in the art an unmet need to be able to efficiently copy and share large amounts of hierarchically organized information.

In addition to the need for efficient copying and sharing of large amounts of hierarchically organized information, there is the need to be able to efficiently compare virtually copied, hierarchically organized information. One obvious way to perform such a comparison is to compare each and every file or directory item of the hierarchies being compared. A problem with this approach is because sub-hierarchies that may be equivalent between the compared hierarchies is not recognized, much duplicate work is performed in comparing items between the hierarchies that are in fact the same. A further difficulty with a simplistic compare operation is that only information concerning the differences between items of the hierarchies, and not the direction or source of the differences, may be obtained. There is no change history available to distinguish between a create in a first hierarchy and a delete in a second hierarchy, for instance. It would likewise not be possible to determine in which hierarchy of the two or more hierarchies being compared a rename of an item occurred.

There is thus an unmet need in the art to be able to perform an efficient compare operation between two or more hierarchies of files and directories to be compared. There is further an unmet need in the art to not only be able to perform such an efficient compare operation but to also be able to ascertain the source of any differences between the hierarchies.

Yet another aspect of software development is that it is often desirable to develop a new feature independently of other features for a period of time and then to merge the new feature with other features of the software should the change prove worth keeping. In a large hierarchy of files and directories, the number of differences and hence merges that are associated with such improvements may become quite large and thus the task of merging differences is tedious and prone to human error. It is characteristic of even a large hierarchy, however, that most merges have predictable defaults.

While merging is a common task performed in regard to software, the extent of a merge typically only includes merging the content of files that have divergent changes. Attributes of a file are not merged and no systematic method for handling the copying of changes from one logical branch of a program to another is provided. Attributes of a hierarchy item may include the content of the item, the name of the item, the parent directory of the item, the mode of the item, the type of input/output associated with an item, the keyword expansion type for the item, a user-designed attribute string of the item, the state of create or delete for the item, and whether the item is a file or directory. Additionally, merges typically occur one item at a time, thereby being an exceedingly time-consuming process especially for very large hierarchies of files and directories.

There is therefore an unmet need in the art to be able to perform a merge operation of two or more hierarchies of files and directories that merges content as well as attribute differences in an efficient manner.

SUMMARY OF THE INVENTION

It is therefore an object of the invention to be able to efficiently copy and share large amounts of hierarchically organized information.

It is further an object of the invention to be able to efficiently compare virtually copied, hierarchically organized information.

It is yet a further object of the invention to be able to perform an efficient compare operation between two or more hierarchies of files and directories to be compared. There is further an unmet need in the art to not only be able to perform such an efficient compare operation but to also be able to ascertain the source of any differences between the hierarchies.

It is still another object of the invention to be able to perform a merge operation of two or more hierarchies of files and directories that merges content as well as attribute differences in an efficient manner.

Therefore, according to a first aspect of the present invention, efficient copying and sharing of large amounts of hierarchically organized information is provided by a method that first creates a virtual copy of a hierarchy of items of files and directories by adding a new link to the root of the hierarchy in order that the hierarchy may be shared by one or more versions of code. The hierarchy is then unshared by copying the hierarchy up to its parent or root only if the hierarchy has not already been unshared previously; upon the unsharing of an item of the hierarchy, the revision history of the item is updated to reflect the unsharing. After the hierarchy has been unshared, items of the hierarchy may then be modified and each modification of an item is reflected in the revision history of that item.

According to a second aspect of the present invention, a method for the efficient comparison of two or more hierarchies of items of files and directories is presented. According to this method, the first step is to initialize a difference list by adding the root directories of the two hierarchies to be compared to the difference list. Next, the items of the hierarchies that are shared, as indicated by an identifier of each item, are merged into a single entry in the difference list. Elimination of single entries characterized as being representative of items having the same database address from the difference list is then performed, so that fewer items remain in the difference list to be recursed upon later. Finally, the items in the difference list are recursively expanded to include all differences between the items of the hierarchies being compared.

According to a third aspect of the invention, a method for maintaining the efficiency of a hierarchy of items by resharing appropriate items of the hierarchy is provided. First, it is determined whether one or more items of a first hierarchy or a portion of the first hierarchy have the identical identifier as another item of a second hierarchy or a portion of the second hierarchy; an item of the first hierarchy and an item of the second hierarchy having the identical identifier are paired. The paired items are then compared to see if they are identical. If the paired items are identical, the items are then reshared such that they are characterized as having the same database address.

According to a fourth embodiment of the present invention, a method for automatically updating a target version of a hierarchy with changes made in a source version of the hierarchy is provided. A target version and a source version of a hierarchy are compared to determine whether any differences between one or more items of the hierarchy exists. Upon identifying these differences, it is then possible to identify a common ancestor revision for each difference. A default action, requiring no human invention, is performed. The appropriate default action is defined by the identity of the common ancestor revision for a particular change.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

In software configuration management, a version of software is developed and released. Development does not stop, however, upon release of the version. Changes or "patches" typically continue to be made to the version after it is released. To accommodate this practice, the methodology of the present invention creates a hierarchy of the released version. The hierarchy is copied so that all changes made to the first version in order to release a second, changed and usually improved version of the software may be isolated from the first version. Additionally, making a copy of the hierarchy of the software code enables one set of changes in the code to be isolated from another set of changes. The various copies of the hierarchy of the software code represent various check points along the evolution of the software code. Where various versions of the software use identical portions of software code, duplication of that portion of the code should be avoided by sharing of the common portion of the code by the various versions. The present invention thus provides for the efficient management of various versions of software for any number of files and directories.

In addition to various versions of software, the present invention is useful for parallel development of software. In software development, it is common that two or more related versions of software code are developed at the same time rather than one after the other in chronological order. For example, two programs may use much of the same code but be designed for use with different hardware or applications. In this instance, it would be advantageous for the two programs to share the portion of code that they both use in order to reduce inefficient duplication of code.

Efficient Copying and Sharing of Large Amounts of Hierarchically Organized Information The methodology of the present invention provides a virtual copy of the hierarchy of files to each distinct application or revision, making a distinct, actual copy of the hierarchy of files only when it is to be modified. In order for the method of sharing of the present invention to work properly, the appearance of a strict hierarchy of files, defined as one parent for each child, must be maintained for each application, although in fact the present invention provides multiple parents for each shared hierarchy of files that is shared by two or more applications.

Figure 1:
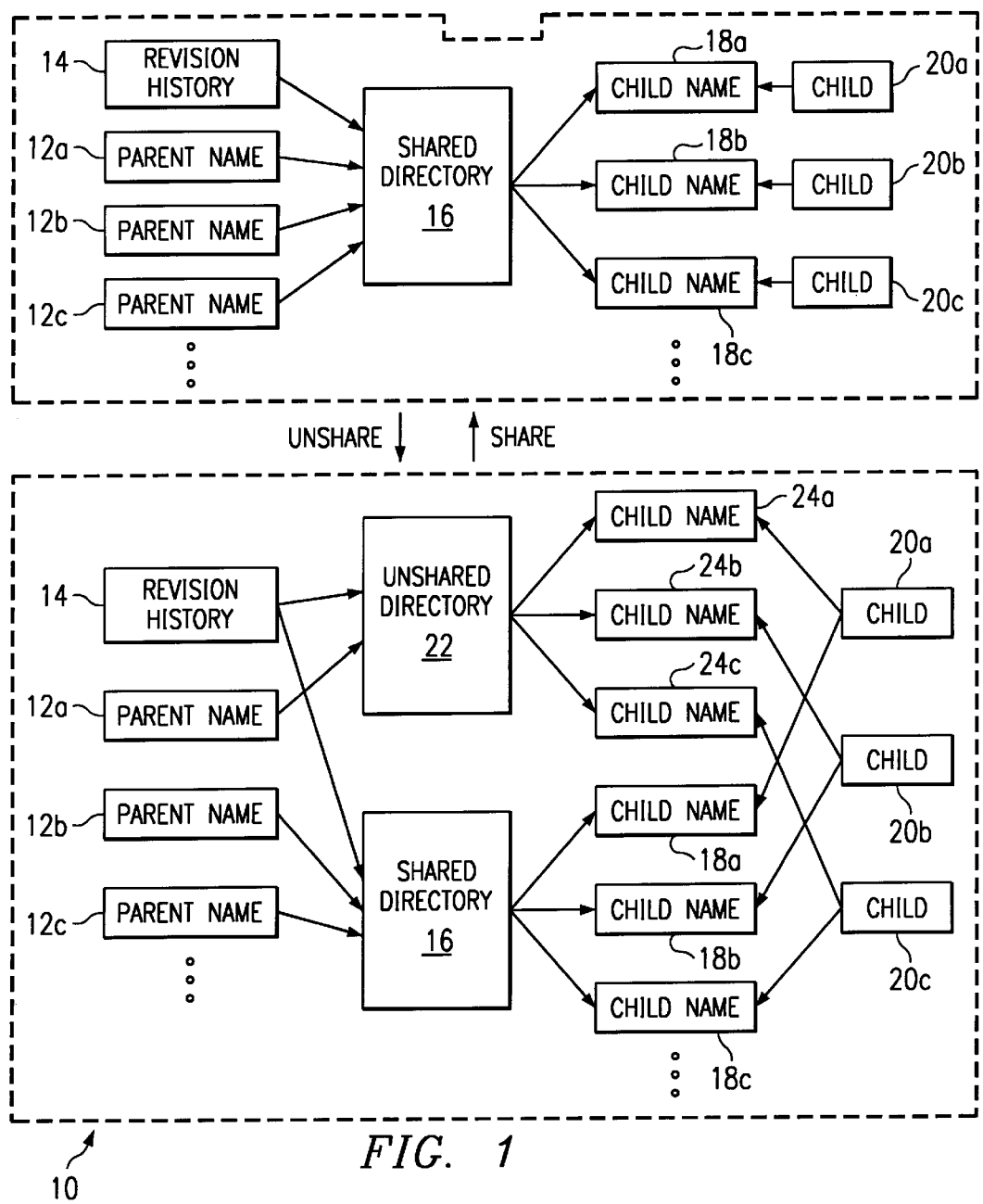
FIG. 1 illustrates the share and unshare operations of hierarchically organized information, according to the present invention.

Referring to the diagram of FIG. 1, a shared directory having multiple parents and multiple children is shown. By adding a new parent link to the shared directory, the shared use of the directory as well as the whole hierarchy of files by the multiple applications is indicated. Thus, a new virtual copy of the hierarchy of files is created by simply adding a new parent link to the root of the shared directory hierarchy.

Part A of FIG. 1 illustrates a shared directory 16 having multiple parents and multiple children. Parent name 12a, 12b, 12c represent three virtual copies each sharing the same hierarchy of files and thus all parent names 12a, 12b, 12c point to the same shared directory 16. Child names 18a, 18b, 18c represent three children files or directories 20a, 20b, 20c, all stemming from shared directory 16. Revision history 14 contains information about the history of the changes made to shared directory 16 itself. Each item of the hierarchy, including files and directories of the hierarchy has a revision history associated with it similar to revision history 14. Thus, children 20a, 20b, 20c, though not shown in FIG. 1, each have a revision history similar to the revision history 14 of shared directory 16.

Each item in the hierarchy has a history of changes made to the item, represented by the revision history, that is shared by all instances of the item. For instance, the item "/a/b" has a history that is shared by every other occurrence of "/a/b." When an item, such as "/a/b" is changed, the change becomes part of the revision history for that item. Another record in the revision history is created. In this sense, the revision history is a collection of records that tracks any changes made to the software code. By reviewing the revision history, then, it is possible to ascertain how an item has been changed, by whom and when. Thus, in order to compare a patch to a first released version of software to a second released version of software, it is necessary to have access to the revision history to conduct the comparison.

Figure 2:
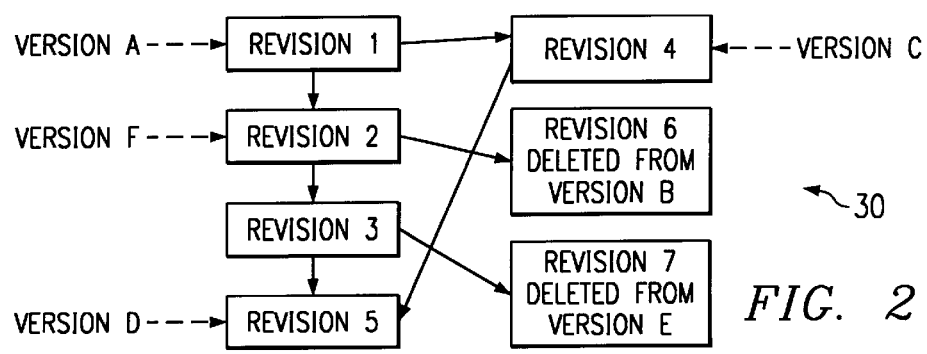
FIG. 2 illustrates an example of a revision history of an item of a hierarchy, according to the present invention.

A sample revision history 30 of an item is shown in FIG. 2. It must be kept in mind that the revision history 30 of FIG. 2 is but one example of what a revision history of an item could be. Version A of a hierarchy references Revision 1 of the item. Revision 2 of the item, referenced by Version F of the hierarchy, is derived from Revision 1. Revision 3 of the item occurred upon making a change to Revision 2 of the item. Revision 4 of the item is derived from Revision 1 and is referenced within Version C of the hierarchy. Revision 5 of the item, referenced within Version D of the hierarchy, occurred upon merging Revisions 3 and 4 of the item. Revision 6, derived from Revision 2 of the item, indicates that the item was deleted from Version B. Finally, Revision 7 indicates that the item was deleted from Version E. As previously discussed, an item may pertain to files and directories of a hierarchy.

In order to modify portions of the hierarchy of files that are shared by two or more applications, it is first necessary to copy, or unshare, that portion of the hierarchy of files. In this sense, modification according to the present invention may be thought of as a copy-on-write operation. Referring to Part B of FIG. 1, an efficient mechanism for unsharing portions of the hierarchy of files in order that they might be modified is shown. Part A and B of FIG. 1 illustrate the unshare operation of a single shared directory of a hierarchy of files. Before the directory can be unshared, or copied, the parent directory of the shared directory, as well as its own parent ad nauseam up to the root, must first be unshared. Thus, even though the shared directory is to be unshared so that it may be modified, sub-hierarchies of the shared directory continue to be shared.

Referring to Part B of FIG. 1, it can be seen that parent name 12a no longer points to a shared directory. Instead, parent name 12a points to unshared directory 22 and is representative of an actual copy of the hierarchy of files that can be modified, unlike a shared copy that cannot be modified. Parent names 12b and 12c still point to shared directory 16 and are representative of virtual copies of the hierarchy of files. Children names 18a, 18b, 18c represent children files 20a, 20b, 20c that all stem from shared directory 16. Children names 24a, 24b, 24c represent children files 20a, 20b, 20c that stem from unshared directory 22. It is important to note that throughout the share and unshare operations illustrated in FIG. 1, one revision history is used to describe the history of changes made to one item. Shared directory 16 and unshared directory 22, for instance, are representative of different states, either shared or unshared, of an item and thus revision history 14 is associated with both states of the item.

To illustrate the above concepts, consider the operation of modifying an item "/a/b" of a hierarchy of files. The first requirement is that the parent of the item, the root of the hierarchy of files "/", must be unshared. Next, "a" in the newly unshared root directory is unshared and then "b" in the newly unshared a directory is unshared. These three unshare operations must be completed before newly unshared b item can be modified.

Next, suppose that item "/a/b2" is to be modified. If a virtual copy of the hierarchy in which the item exists has not occurred in the interim since item "/a/b" has been modified, both the root directory and the "a" directory have already been unshared so that only item "b2" must be unshared before "/a/b2" may be modified. Thus, in order to modify item "/a/b2", only one unshare operation, rather than three unshare operations, must be performed.

This example illustrates an important advantage of the present invention: so long as a virtual copy has not occurred, previously unshared items in the portion of the hierarchy of files to be modified need not be unshared again to perform a subsequent modification. The present invention therefore reduces the amount of time required to modify such a portion of the hierarchy of files. In general, the number of unshare operations required for each modify operation is approximately equal to the number of items to be modified, such that the incremental time required for any subsequent modification approximates that of the linear copy-on-write operation of the prior art.

The present invention reduces the significant instantiation time seen by the user of prior art approaches. A virtual copy of the hierarchy of files is made simply by creating a new parent link to the root of the hierarchy of files. Copying the actual hierarchy of files is postponed until it is modified and only that portion of the hierarchy of files concerned with the desired modification is unshared. Both the method of delaying copying until the hierarchy is to be modified and then only unsharing that portion of the hierarchy necessary to make the modification greatly reduce the instantiation time seen by the user of the system.

Efficient Comparison of Virtually Copied, Hierarchically Organized Information

In software development, while changes made to a hierarchy of files and directories generally need to be kept distinct, after a time it is often desirable to know what has changed since the original hierarchy or other baseline hierarchy. In order to accommodate this need, the present invention provides for the efficient comparison of a changed hierarchy with a baseline hierarchy. If two items reference the same database address, then they are shared. Because it is possible to know what is shared and what is not shared between two hierarchies being compared, the comparison between the two hierarchies, then, only encompasses those portions of the hierarchies that are not shared. Comparison of shared portions of the hierarchies is unnecessary and therefore inefficient because shared portions of the hierarchies are, by definition, equivalent software.

Also because of the information contained within revision history 14 it is possible to not only determine differences between items of the hierarchies being compared but to know the source of such differences. The change history embodied within the revision history 14 identifies changes made as well as provides an indication of in which version of the hierarchy such changes have been made. For instance, it is possible to distinguish between a create operation in one hierarchy and a delete operation in another hierarchy by looking at the revision history for that item. It is also possible to tell in which of the hierarchies being compared that a rename operation has been performed since that will be reflected in the revision history 14 as well.

The efficient comparison operation of the present invention is based on the virtual copying and sharing operations of the hierarchies being compared, unique item identifiers that maintain item identity across all copies, and the change records contained within revision history 14. The comparison operation consists of instructions for pushing, or adding, both root directories of the hierarchies being compared to a list of differences between the hierarchies, instructions for merging items in this difference list and eliminating those that represent shared sub-hierarchies, and instructions for recursing appropriate, remaining items in the difference list. It is desirable in the comparison operation to minimize the recursion operation.

Differences between items in two or more hierarchies are easily determined by looking at the hierarchies rather than going to the actual data which the hierarchies represent.

The first step of the comparison is to initialize a difference list by pushing, or adding, the root directories of each of the hierarchies being compared to the difference list. After pushing the root directories of the hierarchies being compared, the next step is the merge and elimination operation.

Each item of a hierarchy of files and directories has a unique identifier as well as a database address associated with it. Logically equivalent items existing in two or more hierarchies will have the same unique identifier associated with them. Such items, when pushed from the hierarchies being compared, are combined into a single entry in the difference list. If the items in a combined entry have an identical database address, they are shared, and because they are thus known to be identical, the entry is removed from the difference list. If the items in a combined entry are not shared, the entry is marked for recursion.

The final step of the comparison operation is to recursively expand the difference list formed by the push and merge operations discussed above. For each of the unshared items on the difference list, sub-items associated with the items are read and added (pushed) onto the difference list and the merging, elimination, and recursion steps outlined above are repeated for each item of the hierarchy until all differences contained within the hierarchies are in the difference list. To illustrate what is meant by sub-items, consider "/a" as an unshared item. All items having "/a" as their parent directory are considered sub-items of "/a." For instance, "/a/b" and "/a/c" are both sub-items of "/a."

The goal of expansive recursion is to find all differences in the hierarchies without recursing on items shared by the two hierarchies. A key to the efficiency of the compare operation is to avoid recursing on items that are shared between the hierarchies. Once an item from both hierarchies has been pushed and combined into a single entry in the difference list, it is either eliminated from the list because it is shared, or it is ready for recursion. No extra checking is necessary in this situation since recursion is known to be appropriate. Thus, combined entries in the difference list are always recursed on first. This causes most items to be paired in combined entries without the extra checking described below, and hence improves efficiency.

Once all combined entries are recursed upon, entries that contain an item from only of the hierarchies and for which the other hierarchy does not contain the item are recursed upon. In order to separate entries with a single item into those for which the item exists in both hierarchies and those for which the item exists in only one hierarchy, extra checking in the revision history for the item, and possibly in the hierarchy for which the item has not yet been pushed, must be performed.

The revision history for the item will indicate if the item is deleted in the other hierarchy. If so, this is recorded for difference purposes and the entry is recursed on.

Otherwise, the item will be looked up directly by its unique identifier in the other hierarchy. If not present, the entry is recursed upon. Otherwise, recursion is delayed, if possible, until the item is pushed normally. In the case where such delay is not possible, an entry may be recursed on before it becomes a combined entry, and then the recursion can be completed after the combination occurs.

An advantage of the comparison operation of the present invention is that the comparison time is determined by the number of differences between the hierarchies being compared and not by the size of the hierarchies themselves. Shared sub-hierarchies of the hierarchies being compared are identified as such and no comparison operation is performed. An additional advantage is that the comparison operation not only identifies differences between the hierarchies being compared, but also provides other valuable information, including the ability to distinguish between a create in one hierarchy and a delete in the other hierarchy. Such information allows the changes made in one hierarchy to be merged into another, target hierarchy without the need to undo any changes made in the target hierarchy.

Maintaining the Efficiency of Virtually Copied, Hierarchically Organized Information A further aspect of the invention is the capability to re-share portions of the hierarchy that are used by two or more applications or revisions. The re-share operation is necessary to maintain the efficiency of virtually copied, hierarchically organized information. As changes to the software code are made subsequent to the copy operation discussed above, the copies of the hierarchy of files becomes less shared over time and thus the comparisons described above becomes less efficient over time. The present invention, however, provides for re-sharing items of the hierarchy after a merge operation has made them equivalent so that efficiency may be maintained.

The methodology of the present invention encompasses a re-share operation to re-share portions of unshared hierarchies that become equivalent as a result of a merge operation. Revision history 14 is used to quickly and efficiently determine what portions of the hierarchies are equivalent. Re-sharing of portions of the hierarchy is demonstrated by Parts A and B of FIG. 1. In the re-share operation demonstrated by going from Part B to Part A of FIG. 1, the extra parent name 12a associated with unshared directory 22 is eliminated. As shown in Part A of FIG. 1, after the re-share operation all parent names 12a, 12b, and 12c are associated with shared directory 16. The re-share operation typically will happen automatically upon a merge operation upon the software code.

Automatically Applying Changes in a Hierarchy of Revision-Controlled Items

In yet another aspect of software development, it is often desirable to develop a new feature independently of other features for a period of time and then to merge the new feature with other features of the software should it prove to be an acceptable change. In a large hierarchy of files and directories, the number of differences and hence merges that are associated with such improvements may become quite large and thus the task of merging differences is quite tedious and prone to human error. It is characteristic of even a large hierarchy, however, that most merges have predictable defaults. Accordingly, the present invention provides for the storage and later processing of information necessary to safely and automatically merge content and attribute differences between two or more hierarchies. Automatically applying changes in content and attributes of items of a hierarchy frees up the user for more important tasks and reduces the introduction of human errors.

As previously discussed, merging is a common software task but in the prior art the extent of a merge typically only includes merging the content of files that have divergent changes. In the prior art, attributes of a file are not merged and no systematic method for handling the copying of changes from one logical branch of a program to another is provided. Attributes of a hierarchy item may include, but are not limited to, the content of the item, the name of the item, the parent directory of the item, the mode of the item, the type of input/output associated with an item, the keyword expansion type for the item, a user-designed attribute string of the item, the state of create or delete for the item, and whether the item is a file or directory. Additionally, the merge operation typically occurs one item at a time, thereby being an exceedingly time-consuming process especially for very large hierarchies of files and directories.

In the present invention, the merge of most differences between hierarchies can be performed automatically, without user intervention. To accomplish this, compare and merge operations occur between versions of a hierarchy. Versions may be defined as a complete hierarchy of file revisions. Every change to any attribute of an item is logged into the revision history 14 associated with that item. Change records are known as revisions and every revision records the following information: from which revision or revisions the change is derived, the version for which the change is created, flags that indicate which of the attributes have changed since the previous revision, and a unique revision number in the item's revision history. Further, the methodology distinguishes a create in one hierarchy from a delete in another hierarchy. When an item is deleted from a version, the revision history for that item indicates that every attribute of that item has changed. When, however, an item is created, or undeleted, from a version, the revision history for that item indicates no changes. If an item exists in several versions of the hierarchy, a separate delete record in the revision history of the item is created for each delete operation performed. Thus, if the item is deleted from two versions, there will be two delete records in the revision history of that item. It is this delete record that allows one to know that one is propagating a delete rather than a create of an item.

The above concept may be illustrated in terms of a source version and a target version. The target version is updated to include changes in the source version that have not yet been applied to the target version. When a difference in a given item is noted following a comparison of the source version and the target version, the common ancestor or revision of the item referenced by the source version or target version is found.

Various default actions may be defined by the identity of the common ancestor of the item. The default actions are defined according to three possible common ancestor scenarios as shown in the Merge Table below in which the source version is merged into the target version. First, if the common ancestor of the item is the revision referenced by the source version, this indicates that changes have been made only to the target version. Referring again to FIG. 2, an example of this scenario type is shown in which Version A is the source version and either Version C or Version D is the target version. In this case, the default action is to do nothing since there are no changes in the source version that do not already exist in the target version. As shown in the Merge Table, the default action is to do nothing, regardless of whether the change to the target version is a create, delete, or change. Alternate actions for various changes in the target version are also shown in the Merge Table. If the target version change is a create, the alternate merge action would be to perform a delete or discard. If the target version change is a delete, the alternate merge action would be an exist or undelete operation. If the target version change is an attribute change, the alternate merge action would be an exist or revert action. Unlike the default merge actions, user intervention of some sort is required to accomplish the alternate merge actions.

Second, if the common ancestor of the item is the revision referenced by the target version, this indicates that changes have only been made to the source version. Referring to FIG. 2, this scenario is represented by target Version A and source Version F, in which changes have only been made to source Version F. In this case, the default action is to make the target version exactly like the source version, thereby incorporating all source version changes into the target version. In other words, the default action is to cause target Version A to reference what source Version F references, i.e. Revision 2, and to cause all the attributes of target Version A to match the attributes of source Version F. No target version changes will be affected.

As shown in the Merge Table, the default action mirrors the source version changes. If the source version change is a create, the default action is a create. If the source version change is a delete, the default action is a delete. If the source version change is a change, the default action is a change. Alternate actions for various changes in the source version are also shown in the Merge Table. If the source version change is a create and the target version does not exist, then the alternate merge action would be to perform a delete or reject operation. If the source version change is a delete and the target version exists, the alternate merge action would be an exist or rejection operation. If the source version change is a change and the target version exists, the alternate merge action also would be an exist or rejection operation. Unlike the default merge actions, user intervention of some sort is required to accomplish the alternate merge actions.

Third, if the common ancestor of the item is a revision that is not referenced by either the source version or the target version, this indicates that changes have been made to both the source and target versions. For instance, in FIG. 2, changes have been made to both source Version C and target Version F.

There are three possible default actions in response to the third type in which the common ancestor is a revision that is not referenced by either the source or target versions. These three types of default actions are clearly demonstrated in the Merge Table below. The first default action is concerned with a situation where disjoint attributes of the source and target versions are affected and there is thus non-conflicting changes between the source and target versions. Such a situation might arise, for example, where changes have been made to the mode of the item in the source version and to the name of the item in the target version. Clearly, changes have been made to disjoint attributes, in this example, the mode and name attributes of the item, in the source and target versions. In this case, the source version changes are copied into the target without loosing any of the changes made to the target version. This default action is illustrated in the Merge Table where a change has occurred to the source version, a change to a different set of attributes has occurred to the target version, and the default action is to combine the changes of both the source and target versions by copying the change operation of the source version into the target version without loosing the changes already made to the target version. An alternate action in this case would be a user override of some sort.

The second default action arises in cases where conflicts arise with regard to certain limited value attributes that have been changed in the source and target versions. Examples of limited value attributes include the mode of an item, the input/output mode of an item, the keyword expansion type of an item, and the state of create or delete of an item. In this case, the more inclusive or conservative of the changes between the source and target versions is favored. For instance, where an item has been deleted from the source version and changed in the target version, the default action would be the change in the target version. This default action would be performed without user override. This default action is illustrated in two examples shown in the Merge Table that follows. First, in the scenario in which a delete occurs in the source version, a change occurs in the target version and the default merge action is to keep the change of the target version. An alternate action in this scenario, requiring some sort of user intervention, would be to keep the delete of the source version. Second, in the scenario in which a change occurs in the source version, a delete occurs in the target version and the default merge action is to keep the change of the source version. An alternate action in this scenario, requiring some sort of user intervention, would be to keep the delete of the target version.

The third action arises in cases where conflicts occur in item attributes that are characterized as having an unlimited range of values, such as item content, item name, and the parent name of an item. In this situation, user intervention is required to sort out such conflicts. There is thus no default action taken, although in some cases, such as in content merge between the target and source versions, much can be done to automate the process for the user. Merge as the default action in which different changes are made to the source and target versions is illustrated in the Merge Table below. An alternate action in this case, requiring some sort of user intervention, would be to choose the change of either the source version or the target version.

MERGE TABLE

| SOURCE STATE | TARGET STATE | DEFAULT ACTION | ALTERNATE ACTION |
|---|---|---|---|
| TARGET ONLY CHANGES | | | |
| does-not-exist | create | NOTHING | DELETE (discard) |
| exist | delete | NOTHING | EXIST (undelete) |
| exist | change | NOTHING | EXIST (revert) |
| SOURCE ONLY CHANGES | | | |
| create | does-not-exist | CREATE | DELETE (reject) |
| delete | exist | DELETE | EXIST (reject) |
| change | exist | CHANGE | EXIST (reject) |
| SOURCE AND TARGET CHANGES | | | |
| change to an attribute(s) | change to a different attribute(s) | COMBINED CHANGES | USER OVERRIDE |
| delete | change | CHANGE | DELETE |
| change | delete | CHANGE | DELETE |
| change | change | MERGE | CHOOSE SOURCE OR TARGET |

According to this aspect of the invention, a large number of the content and attribute changes made to an item shared by a source version and a target version may be merged automatically. The default merge process is able to encompass a complete hierarchy of items between the target and source versions. Create changes and delete changes between the target and source versions are completed automatically, without need for user intervention. Sufficient information concerning the changes is stored in the revision history of an item to enable reasonable default actions to be taken in most merge operations of the target and source versions. Default actions free up the user to concentrate on other operations that require user interaction. This aspect of the present invention, then, is easily scalable to very large hierarchies having lots of differences and is suitable for routine use.

While the invention has been particularly shown and described with reference to a preferred embodiment, it will be understood by those skilled in the art that various changes in form and detail may be made therein without departing from the spirit and scope of the invention.

What is claimed is:

1. A method for the efficient copying and sharing of large amounts of hierarchically organized information, comprising the steps:

a) creating one or more virtual copies of a hierarchy to be shared by a plurality of versions and having a plurality of items by adding a new link to the root of the hierarchy for each virtual copy of the one or more virtual copies to be created, wherein a revision history of each item of the plurality of items indicates any changes that have been made to each item and wherein each virtual copy of said shared hierarchy thus created is used by a corresponding version of the plurality of versions;

b) deciding that a first portion of the hierarchy is to be modified;

c) identifying a second portion of the hierarchy if the first portion of the hierarchy does not include the root of the hierarchy, of which the first hierarchy is a sub-hierarchy, that includes the root of the hierarchy;

d) unsharing the first portion of the hierarchy to be modified by first copying the second portion of the hierarchy if the second portion has been identified and is not already unshared up to the root of the hierarchy and then copying the first portion of the hierarchy if the first portion of the hierarchy is not already unshared to generate an unshared portion of the hierarchy; and e) modifying one or more items of the plurality of items of the unshared portion of the hierarchy, wherein the revision history for each said modified item is updated to reflect the modification.

2. The method of claim 1, wherein after the step of unsharing the first portion of the hierarchy is performed, a plurality of sub-hierarchies of the first portion of the hierarchy continue to be shared.

3. A method for the efficient comparison of two or more hierarchies of files and directories, comprising the steps of:

a) initializing a difference list by adding the root directory of a first hierarchy and the root directory of a second hierarchy to the difference list, wherein each item of the first hierarchy and each item of the second hierarchy has an identifier and a database address associated with it and wherein the first hierarchy is a first virtual copy of a hierarchy shared by a plurality of versions and was created by adding a first single link to a root of the hierarchy inclusive and wherein the second hierarchy is a second virtual copy of the hierarchy and was created by adding a second single link to the root of the hierarchy inclusive;

b) determining whether a first item of the first hierarchy has a first identifier that is equal to a second identifier of a second item of the second hierarchy;

c) merging the first item of the first hierarchy with the second item of the second hierarchy into a single entry in the difference list if the first identifier of the first item is equal to the second identifier of the second item of the second hierarchy indicating that the first item and the second item are shared;

d) repeating steps b and c for each item of the plurality of items of the first hierarchy;

e) determining whether the first item of the first hierarchy has a first database address that is equal to a second database address of the second item of the second hierarchy;

f) removing the single entry from the difference list if the first database address of the first item of the first hierarchy is equal to the second database address of the second item of the second hierarchy;

g) repeating steps e and f for each item of the plurality of items of the first hierarchy so that the difference list includes only items that are not shared by the first hierarchy and the second hierarchy; and h) recursively expanding the difference list by adding a plurality of sub-items onto the difference list for each of the items on the difference list and repeating steps b through h as required so that the difference list contains all differences between the plurality of items of the first hierarchy and the plurality of items of the second hierarchy, wherein the time required for a computer to perform a) to h) is determined by a number of differences between the first and second hierarchies and not by a size of the first and second hierarchies.

4. The method of claim 1, further comprising a method for resharing any portion of a hierarchy that is used by two or more revisions in order to maintain the efficiency of the hierarchy, comprising the steps of:

a) determining whether a first item of a first hierarchy or a portion of the first hierarchy has the same identifier as a second item of a second hierarchy or a portion of the second hierarchy;

b) pairing the first item of the first hierarchy and the second item of the second hierarchy if the first item has the same identifier as the second item;

c) comparing the first item and the second item to determine if they are logically equivalent items; and d) resharing the first item and the second item if they are logically equivalent items so that the first item and the second item have the same database address.

5. A method for automatically updating a target version of a hierarchy with changes made in a source version of the hierarchy by defining and exercising appropriate default actions, comprising the steps of:

a) comparing a target version of a hierarchy having a plurality of items with a source version of the hierarchy and shared by a plurality of versions, wherein each change made to an attribute of the one or more attributes of an item of the hierarchy is recorded as a change record in a revision history of the item;

b) identifying any difference between the target version and the source version in the one or more attributes of each item of the hierarchy;

c) identifying a common ancestor revision of the item in which there is no difference of the one or more attributes of the item for each item of the hierarchy in which there is a difference noted in the one or more attributes of between the target version and the source version; and d) executing without human intervention a default action defined by the identify of the common ancestor revision of the item in order to merge the source version into the target version.

6. The method of claim 5, wherein if the common ancestor revision of the item is referenced by the source version, then the attributes of the item has been changed in the target version and the default action is to do nothing.

7. The method of claim 5, wherein if the common ancestor revision of the item is referenced by the target version, then the item has been changed in the source version and the default action is to incorporate any source version changes in the one or more attributes of the item into the target version.

8. The method of claim 5, wherein if the common ancestor revision of the item is not referenced by either the source version or the target version of the hierarchy, then the item has been changed in both the source version and the target version.

9. The method of claim 8, wherein if there is no conflict between the changes in the source version and the target version, then the default action is to combine the source version and the target version changes to the item, and wherein if there is conflict between the changes in the source version and the target version to one or more limited value attributes of the item, then the default action is to choose the more inclusive of the source version and the target version changes to the item, and wherein if there is conflict between the changes in the source version and the target version to one or more attributes of the item having an unlimited range of values, there is no default action.

10. A computer readable storage media containing a computer program for the efficient copying and sharing of large amounts of hierarchically organized information, comprising:
   a) instructions for creating one or more virtual copies of a hierarchy to be shared by a plurality of versions and having a plurality of items by adding a new link to the root of the hierarchy for each virtual copy of the one or more virtual copies to be created, wherein a revision history of each item of the plurality of items indicates any changes that have been made to each item and wherein each virtual copy of said shared hierarchy thus created is used by a corresponding version of the plurality of versions;
   b) instructions for deciding that a first portion of the hierarchy is to be modified;
   c) instructions for identifying a second portion of the hierarchy if the first portion of the hierarchy does not include the root of the hierarchy, of which the first hierarchy is a sub-hierarchy, that includes the root of the hierarchy;
   d) instructions for unsharing the first portion of the hierarchy to be modified by first copying the second portion of the hierarchy if the second portion has been identified and is not already unshared up to the root of the hierarchy and then copying the first portion of the hierarchy if the first portion of the hierarchy is not already unshared to generate an unshared portion of the hierarchy; and
   e) instructions for modifying one or more items of the plurality of items of the unshared portion of the hierarchy, wherein the revision history for each said modified item is updated to reflect the modification.

11. The computer readable storage media of claim 10, wherein after the instructions for unsharing the first portion of the hierarchy are performed, a plurality of sub-hierarchies of the first portion of the hierarchy continue to be shared.

12. A computer readable storage media containing a computer program for the efficient comparison of two or more hierarchies of files and directories, comprising:
   a) instructions for initializing a difference list by adding the root directory of a first hierarchy and the root directory of a second hierarchy to the difference list, wherein each item of the first hierarchy and each item of the second hierarchy has an identifier and a database address associated with it and wherein the first hierarchy is a first virtual copy of a hierarchy shared by a plurality of versions and was created by adding a first single link to a root of the hierarchy inclusive and wherein the second hierarchy is a second virtual copy of the hierarchy and was created by adding a second single link to the root of the hierarchy inclusive;
   b) instructions for determining whether a first item of the first hierarchy has a first identifier that is equal to a second identifier of a second item of the second hierarchy;
   c) instructions for merging the first item of the first hierarchy with the second item of the second hierarchy into a single entry in the difference list if the first identifier of the first item is equal to the second identifier of the second item of the second hierarchy indicating that the first item and the second item are shared;
   d) instructions for repeating instructions b and c for each item of the plurality of items of the first hierarchy;
   e) instructions for determining whether the first item of the first hierarchy has a first database address that is equal to a second database address of the second item of the second hierarchy;
   f) instructions for removing the single entry from the difference list if the first database address of the first item of the first hierarchy is equal to the second database address of the second item of the second hierarchy;
   g) instructions for repeating instructions e and f for each item of the plurality of items of the first hierarchy so that the difference list includes only items that are not shared by the first hierarchy and the second hierarchy; and
   h) instructions for recursively expanding the difference list by adding a plurality of sub-items onto the difference list for each of the items on the difference list and repeating instructions b through h as required so that the difference list contains all differences between the plurality of items of the first hierarchy and the plurality of items of the second hierarchy.

13. A computer readable storage media containing a computer program for resharing any portion of a hierarchy that is used by two or more revisions in order to maintain the efficiency of the hierarchy, comprising:
   a) instructions for determining whether a first item of a first hierarchy or a portion of the first hierarchy has the same identifier as a second item of a second hierarchy or a portion of the second hierarchy;
   b) instructions for pairing the first item of the first hierarchy and the second item of the second hierarchy if the first item has the same identifier as the second item;
   c) instructions for comparing the first item and the second item to determine if they are identical items; and
   d) instructions for resharing the first item and the second item if they are identical items so that the first item and the second item have the same database address.

14. A computer readable storage media containing a computer program for automatically updating a target version of a hierarchy with changes made in a source version of the hierarchy by defining and exercising appropriate default actions, comprising:
   a) instructions for comparing a target version of a hierarchy having a plurality of items with a source version of the hierarchy and shared by a plurality of versions, wherein each change made to an attribute of the one or more attributes of an item of the hierarchy is recorded as a change record in a revision history of the item;
   b) instructions for identifying any difference between the target version and the source version in the one or more attributes of each item of the hierarchy;
   c) instructions for identifying a common ancestor revision of the item in which there is no difference of the item for each item of the hierarchy in which there is a difference noted between the target version and the source version; and
   d) instructions for executing without human intervention a default action defined by the identify of the common ancestor revision of the item in order to merge the source version into the target version.

15. The computer readable storage media of claim 14, wherein if the common ancestor revision of the item is referenced by the source version, then the attributes of the item has been changed in the target version and the default action is to do nothing.

16. The computer readable storage media of claim 14, wherein if the common ancestor revision of the item is referenced by the target version, then the item has been changed in the source version and the default action is to incorporate any source version changes in the one or more attributes of the item into the target version.

17. The computer readable storage media of claim 14, wherein if the common ancestor revision of the item is not referenced by either the source version or the target version of the hierarchy, then the item has been changed in both the source version and the target version.

18. The computer readable storage media of claim 17, wherein if there is no conflict between the changes in the source version and the target version, then the default action is to combine the source version and the target version changes to the item, and wherein if there is conflict between the changes in the source version and the target version to one or more limited value attributes of the item, then the default action is to choose the more inclusive of the source version and the target version changes to the item, and wherein if there is conflict between the changes in the source version and the target version to one or more attributes of the item having an unlimited range of values, there is no default action.

* * * * *